United States Patent
Kurokawa

(10) Patent No.: US 9,376,075 B2
(45) Date of Patent: Jun. 28, 2016

(54) VEHICLE BODY STRUCTURE

(71) Applicant: TOYOTA JIDOSHA KABUSHIKI KAISHA, Toyota-shi, Aichi-ken (JP)

(72) Inventor: Hiroyuki Kurokawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/735,610

(22) Filed: Jun. 10, 2015

(65) Prior Publication Data

US 2015/0367797 A1    Dec. 24, 2015

(30) Foreign Application Priority Data

Jun. 19, 2014   (JP) .................................. 2014-126258

(51) Int. Cl.
*B62D 25/08*    (2006.01)
*B60R 19/34*    (2006.01)
*B62D 21/15*    (2006.01)

(52) U.S. Cl.
CPC .............. *B60R 19/34* (2013.01); *B62D 21/152* (2013.01); *B62D 25/08* (2013.01)

(58) Field of Classification Search
CPC ...... B62D 25/00; B62D 25/08; B62D 25/085; B62D 21/152; B62D 27/00; B62D 27/02; B62D 27/023; B62D 27/06
USPC ....................................... 296/203.01, 203.02
See application file for complete search history.

(56) References Cited

U.S. PATENT DOCUMENTS

| | | | |
|---|---|---|---|
| 3,633,934 A | 1/1972 | Wilfert | |
| 3,819,224 A | 6/1974 | Casey et al. | |
| 7,887,123 B2 * | 2/2011 | Honji | B62D 21/152 280/488 |
| 8,764,104 B2 * | 7/2014 | Kihara | B60R 19/34 293/155 |
| 2005/0077711 A1 | 4/2005 | Yasui et al. | |
| 2011/0148151 A1 * | 6/2011 | Abe | B60R 19/34 296/203.02 |

FOREIGN PATENT DOCUMENTS

| | | |
|---|---|---|
| JP | 2004-330948 A | 11/2004 |
| JP | 2005-219563 A | 8/2005 |
| JP | 2005-231435 A | 9/2005 |
| JP | 3974567 B2 | 9/2007 |
| JP | 4875508 B2 | 2/2012 |
| JP | 2012-166742 A | 9/2012 |

* cited by examiner

*Primary Examiner* — Dennis H Pedder
(74) *Attorney, Agent, or Firm* — Oliff PLC

(57) ABSTRACT

A vehicle body structure includes: a side member that is disposed running along a vehicle front-rear direction; an upper member that, when viewed along the vehicle width direction, is disposed running along the vehicle front-rear direction at a vehicle upper side of the side member, and comprises a vehicle front-rear direction outside end portion that is positioned at a different position in a vehicle up-down direction from a position in the vehicle up-down direction of a vehicle front-rear direction outside end portion of the side member; a coupling member that couples the vehicle front-rear direction outside end portion of the upper member and the vehicle front-rear direction outside end portion of the side member; and a crash box that comprises a vehicle front-rear direction inside end portion that is joined to the coupling member.

6 Claims, 4 Drawing Sheets

VEHICLE BODY STRUCTURE

CROSS-REFERENCE TO RELATED APPLICATION

This application is based on and claims priority under 35 USC 119 from Japanese Patent Application No. 2014-126258 filed on Jun. 19, 2014, the disclosures of which is incorporated by reference herein.

BACKGROUND

1. Technical Field

The present invention relates to a vehicle body structure.

2. Related Art

Known vehicle body structures are provided with a crash box on an extension line toward the vehicle front side of a front side member (see, for example Japanese Patent No. 3974567).

However, in such a configuration, collision load that is not fully absorbed by the crash box in the event of a frontal collision of the vehicle is transmitted unmodified to the front side member, such that the front side member needs to have increased plate thickness, to be reinforced by reinforcement, or the like. Thus there is still room for improvement in structures reducing the concentration of load at a side member.

SUMMARY

The present invention thereby provides a vehicle body structure capable of reducing concentration of load at a side member when the load is input along the vehicle front-rear direction.

A first aspect of the present invention is a vehicle body structure including: a side member that is disposed running along a vehicle front-rear direction; an upper member that, when viewed along the vehicle width direction, is disposed running along the vehicle front-rear direction at a vehicle upper side of the side member, and comprises a vehicle front-rear direction outside end portion that is positioned at a different position in a vehicle up-down direction from a position in the vehicle up-down direction of a vehicle front-rear direction outside end portion of the side member; a coupling member that couples the vehicle front-rear direction outside end portion of the upper member and the vehicle front-rear direction outside end portion of the side member; and a crash box that comprises a vehicle front-rear direction inside end portion that is joined to the coupling member.

In the above aspect, the vehicle front-rear direction outside end portion of the upper member has a different position in the vehicle up-down direction from the position in the vehicle up-down direction of the vehicle front-rear direction outside end portion of the side member, and the vehicle front-rear direction outside end portion of the upper member and the vehicle front-rear direction outside end portion of the side member are coupled together by the coupling member. The vehicle front-rear direction inside end portion of the crash box is joined to the coupling member. Thus, when load is input to the vehicle along the vehicle front-rear direction by, for example, a frontal collision or a rear face collision, load that is not fully absorbed by the crash box is transmitted not only to the side member but also transmitted to the upper member through the coupling member. Concentration of load at the side member is accordingly reduced.

The above aspect may further include a bumper reinforcement that is joined to a vehicle front-rear direction outside end portion of the crash box, and a center line passing through centroids of the bumper reinforcement and a center line passing through centroids of the crash box may be at substantially the same position in the vehicle up-down direction.

In the above configuration, the center line passing through the centroid of the bumper reinforcement, joined to the vehicle front-rear direction outside end portion of the crash box, and the center line passing through the centroid of the crash box are at the same position in the vehicle up-down direction. Thus, load input to the bumper reinforcement along the vehicle front-rear direction by, for example, a frontal collision or a rear face collision is efficiently transmitted to the coupling member through the crash box.

The above aspect may further include a bumper reinforcement that is joined to a vehicle front-rear direction outside end portion of the crash box, and the vehicle front-rear direction inside end portion of the crash box may be joined to the coupling member at a position further toward a vehicle lower side than a vehicle up-down direction center portion of the coupling member.

In the above configuration, the bumper reinforcement is joined to the vehicle front-rear direction outside end portion of the crash box, and the vehicle front-rear direction inside end portion of the crash box is joined to the coupling member further to the vehicle lower side than the vehicle up-down direction center portion of the coupling member. Thus, pedestrian protection performance, in which the legs of a pedestrian are protected in the event of a frontal collision or a rear face collision of the vehicle with the pedestrian, is improved.

In the above aspect, the coupling member may include a curved portion curving toward a vehicle front-rear direction outer side.

In the above configuration, the coupling member has the curved portion curving toward the vehicle front-rear direction outer side. Thus, when load is input to the coupling member along the vehicle front-rear direction by, for example, a frontal collision or a rear face collision, due to the curved portion of the coupling member, a cancelling moment acts against the input load. Deformation of the coupling member is thereby suppressed.

In the above aspect, the vehicle front-rear direction inside end portion of the crash box may extend toward the side member; and a fastening point of the vehicle front-rear direction inside end portion of the crash box to the coupling member and a center line passing through centroids of the side member may be provided at substantially the same position in the vehicle up-down direction.

In the above configuration, the fastening point of the vehicle front-rear direction inside end portion of the crash box, which extends toward the side member, to the coupling member is provided at the same position in the vehicle up-down direction as the center line passing through the centroid of the side member. Thus, load input through the crash box to the coupling member along the vehicle front-rear direction by, for example, a frontal collision or a rear face collision is efficiently transmitted to the side member.

BRIEF DESCRIPTION OF THE DRAWINGS

Exemplary embodiments will be described in detail based in the following figures, wherein.

DETAILED DESCRIPTION

Detailed explanation follows regarding an exemplary embodiment, based on the drawings. Note that for ease of explanation, in each of the drawings the arrow UP indicates the vehicle upper direction, the arrow FR indicates the vehicle front direction, and the arrow LH indicates the vehicle left direction. Moreover, in the following explanation, unless specified otherwise, reference to the front-rear, up-down, and left-right directions indicate front-rear in the vehicle front-rear direction, up-down in the vehicle up-down direction, and left-right in the vehicle left-right direction (vehicle width direction). A vehicle body structure 10 according to the present exemplary embodiment may be applied to a front section side or a rear section side of a vehicle 12; however, application to the front section side of the vehicle 12 is explained herein as an example.

Figure 1:
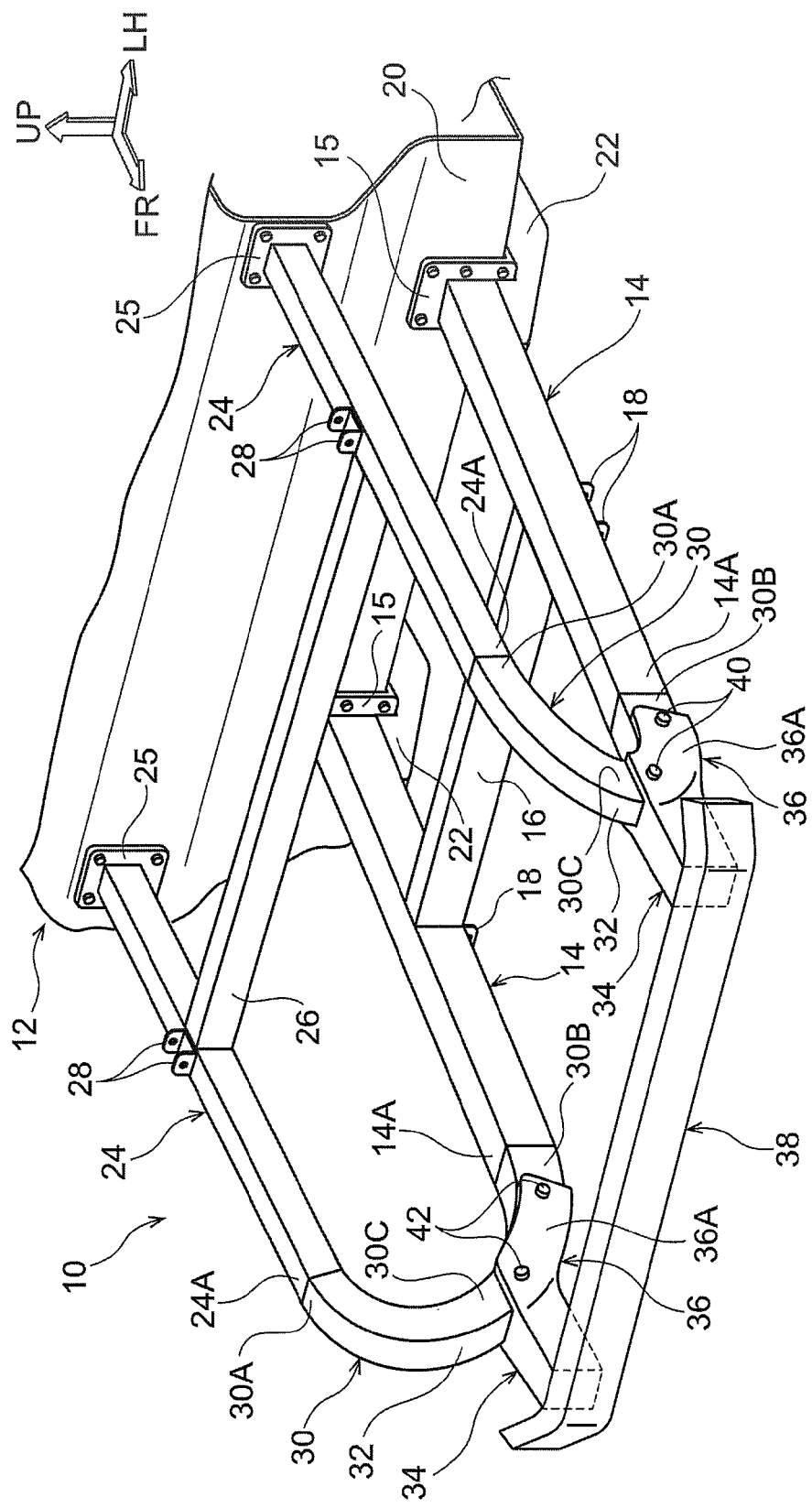
FIG. 1 is a perspective view illustrating a vehicle body structure according to an exemplary embodiment.
Figure 2:
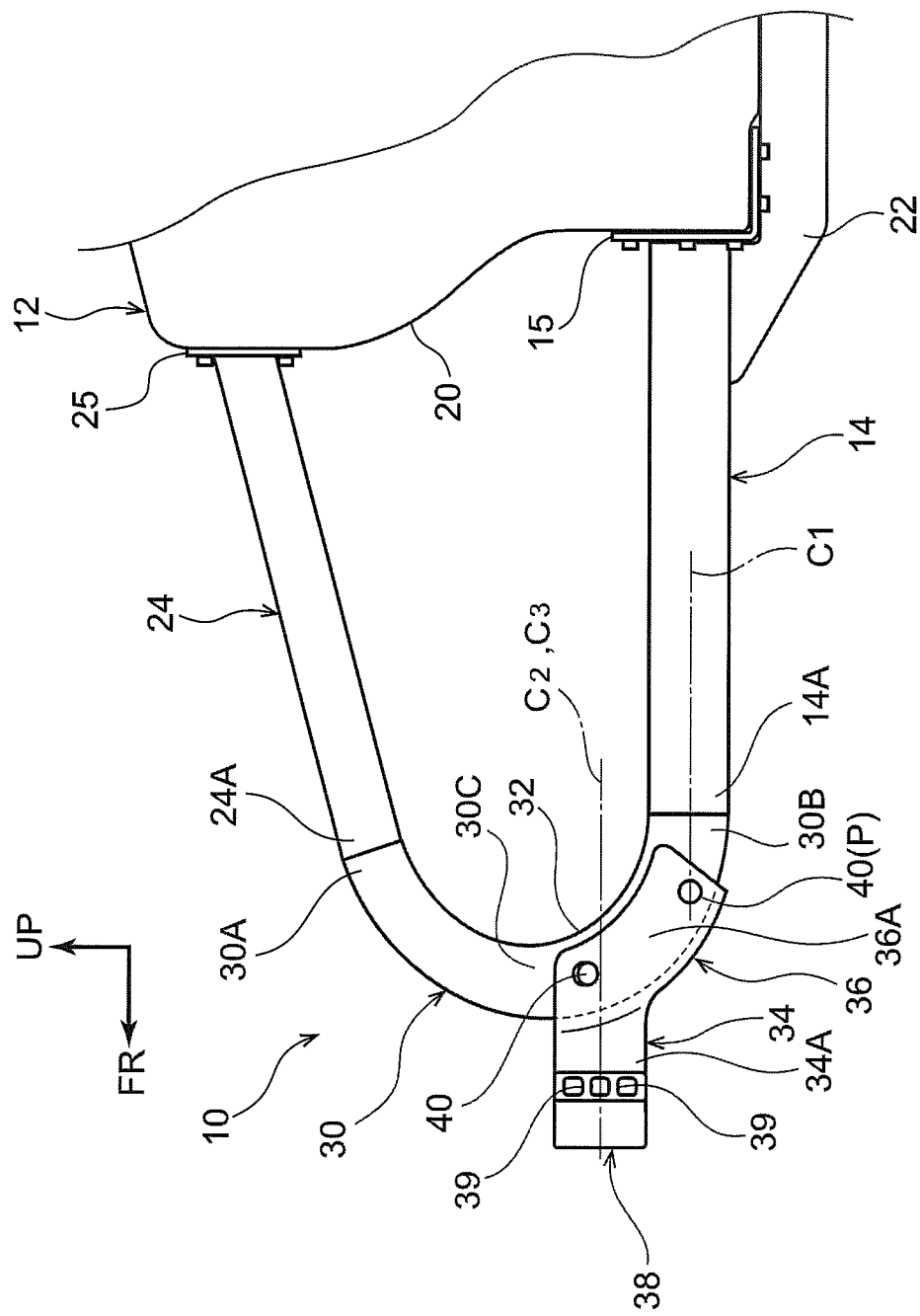
FIG. 2 is a side view illustrating the vehicle body structure according to the exemplary embodiment.
Figure 3:
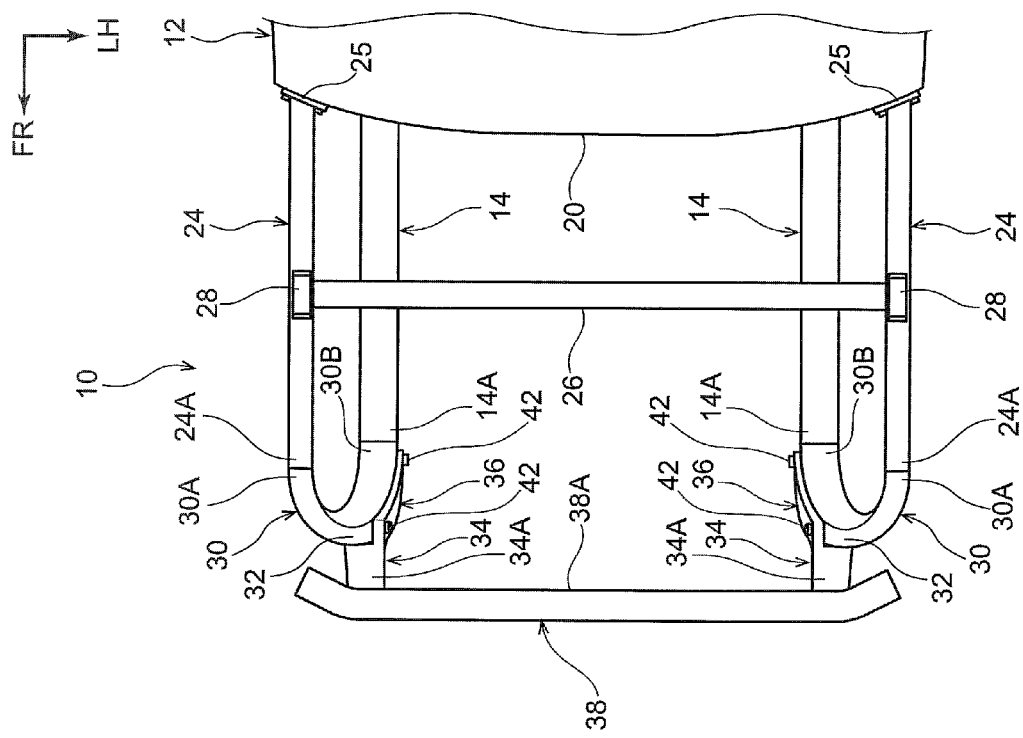
FIG. 3 is a plan view illustrating the vehicle body structure according to the exemplary embodiment.

As illustrated in FIG. 1 to FIG. 3, a pair of left and right front side members 14 are disposed extending along the vehicle front-rear direction at the front section side of the vehicle 12. Each front side member 14 is formed in a rectangular closed cross-section shape by extrusion forming a lightweight metal material, such as aluminum, with a uniform cross-section. Flat plate shaped flange portions 15, each with a substantially L shaped cross-section, are fixed to rear end portions of the respective front side members 14, and the flange portions 15 are attached to respective left and right sides at a lower end portion of a dash panel 20 by fastening using bolts.

Length direction (vehicle front-rear direction) portions partway along the front side members 14 are coupled together by a lower cross-member 16 extending along the vehicle width direction. The lower cross-member 16 is also formed in a rectangular closed cross-section shape by extrusion framing a lightweight metal material, such as aluminum, with a uniform cross-section. Lower brackets 18 for attachment to lower suspension arms, not illustrated in the drawings, are provided at lower faces of the coupling portions of the lower cross-member 16 to the respective front side members 14 (see FIG. 1).

In a side view viewed along the vehicle width direction, a pair of left and right upper members 24 are disposed extending along the vehicle front-rear direction at vehicle upper sides of the respective front side members 14. Each upper member 24 is formed in a rectangular closed cross-section shape by extrusion forming a lightweight metal material, such as aluminum, with a uniform cross-section. Flat plate shaped flange portions 25 are fixed to rear end portions of the respective upper members 24, and the flange portions 25 are attached to respective left and right sides at an upper end portion of the dash panel 20 (front pillar sides) by fastening using bolts.

Length direction (vehicle front-rear direction) portions partway along the upper members 24 are coupled together by an upper cross-member 26 extending along the vehicle width direction. The upper cross-member 26 is also formed in a rectangular closed cross-section shape by extrusion forming a lightweight metal material, such as aluminum, with a uniform cross-section. Upper brackets 28 for attachment to upper suspension arms, not illustrated in the drawings, are provided at upper faces of the coupling portions of the upper cross-member 26 to the respective upper members 24 (see FIG. 1).

The cross-section surface area of each front side member 14 is formed larger than the cross-section surface area of each upper member 24. Namely, each front side member 14 is formed with a bigger rectangular closed cross-section shape than each upper member 24. A pair of left and right floor side members 22, each formed with a rectangular closed cross-section shape, are disposed at the lower side of the dash panel 20, extending along the vehicle front-rear direction contiguously to the respective front side members 14.

A vehicle up-down direction position of a front end portion (vehicle front-rear direction outside end portion) 24A of each upper member 24 is positioned at a different position from a vehicle up-down direction position of a front end portion (vehicle front-rear direction outside end portion) 14A of the respective front side member 14. Namely, the front end portions 24A of the upper members 24 are disposed at higher positions than the front end portions 14A of the respective front side members 14.

The upper members 24 are disposed further to the vehicle width direction outside than the respective front side members 14 (see FIG. 3). The front end portions 24A of the left and right upper members 24 are joined to the front end portions 14A of the respective front side members 14 by coupling members (curved members) 30. Each coupling member 30 is formed substantially U shaped in a side view, with a curved portion 32 (curvature) curving toward the vehicle front side (vehicle front-rear direction outside), using a lightweight metal material such as aluminum.

Note that, as described above, the size of the cross-section surface areas of the upper members 24 and the front side members 14 differ from each other, such that the coupling members 30 couple together members with cross-section surface areas of different sizes. Thus, each coupling member 30 is formed with a rectangular closed cross-section shape by hydroforming a lightweight metal material with a uniform cross-section, or by joining together an outer panel and an inner panel.

Upper rear end portions 30A of the coupling members 30 are joined to the front end portions 24A of the respective upper members 24 by arc welding or the like, and lower rear end portions 30B of the coupling members 30 are joined to the front end portions 14A of the respective front side members 14 by arc welding or the like. Note that the upper rear end portions 30A of the coupling members 30 may be overlapped with the front end portions 24A of the respective upper members 24, and the lower rear end portions 30B of the coupling members 30 may be overlapped with the front end portions 14A of the respective front side members 14, and each fastened (joined) together by bolts, rivets, or the like.

Crash boxes 34, each extending along the vehicle front-rear direction, are provided further to the vehicle lower side than vehicle up-down direction center portions of the curved portions 32 of the respective coupling members 30. Each crash box 34 is formed in a rectangular closed cross-section shape using a lightweight metal material, such as aluminum. Fitting portions 36, each with a substantially U shaped cross-section capable of cladding the curved portions 32 of the respective coupling members 30 from the vehicle lower side, are integrally formed extending toward the front side members 14 at rear end portions (vehicle front-rear direction inside end portions) of the respective crash boxes 34.

Each fitting portion 36 includes a pair of flange portions 36A facing each other in the vehicle width direction. The flange portions 36A are formed substantially running along respective wall faces 30C of the coupling member 30, which face each other in the vehicle width direction. Two through-holes (not illustrated in the drawings), each piercing through in the vehicle width direction, are formed to each flange portion 36A. Two through-holes (not illustrated in the drawings), each piercing through in the vehicle width direction, are also formed to each wall face 30C of the coupling member 30 covered by the flange portion 36A, and these through-holes can be placed in communication with the respective through-holes of the flange portion 36A.

Thus, the fitting portions 36 (flange portions 36A) of the crash boxes 34 clad the curved portions 32 (wall faces 30C) of the respective coupling members 30 from the vehicle lower side, bolts 40 are inserted from the vehicle width direction outside (or the inside) through the through-holes that are in communication with each other, and nuts 42 are screwed onto the bolts 40, thereby fastening (joining) the crash boxes 34 to the curved portions 32 at a position further toward the vehicle lower side than the vehicle up-down direction center portions of the respective curved portions 32.

Among the through-holes formed to each curved portion 32, the through-hole nearest the lower rear end portion 30B (a lower portion fastening point P) is provided at substantially the same position in the vehicle up-down direction as a center line C1 (illustrated by a single-dotted dashed line) passing through centroids of each front side member 14 (see FIG. 2). Circular cylindrical shaped collar members (not illustrated in the drawings), in communication with the respective through-holes inside the curved portions 32, may be provided in advance in order to suppress cross-section deformation due to the fastening.

There is no limitation to a configuration in which the crash boxes 34 are fastened to the respective curved portions 32 by the bolts 40 and the nuts 42, and a configuration may be applied in which the crash boxes 34 are fastened (joined) to the respective curved portions 32 by rivets or the like, not illustrated in the drawings. Alternatively, a configuration may be applied in which the crash boxes 34 are joined to the respective curved portions 32 by arc welding or the like.

A front bumper reinforcement member 38, extending along the vehicle width direction, is provided spanning between front end portions (vehicle front-rear direction outside end portions) 34A of the respective crash boxes 34. The front bumper reinforcement member 38 is formed in a rectangular closed cross-section shape by extrusion forming a lightweight metal material, such as aluminum, with a uniform cross-section. A rear wall portion 38A (see FIG. 3) of the front bumper reinforcement member 38 is joined to the front end portions 34A of the respective crash boxes 34 by arc welding or the like.

Note that the front bumper reinforcement member 38 may be configured fastened (joined) to the front end portions 34A of the crash boxes 34 by bolts and rivets, or the like. The front bumper reinforcement member 38 is joined to the crash boxes 34 such that a center line C2 (illustrated by a single-dotted dashed line) passing through centroids of the front bumper reinforcement member 38 is at substantially the same position in the vehicle up-down direction as a center line C3 (illustrated by a single-dotted dashed line) passing through centroids of the respective crash boxes 34 (see FIG. 2).

There is no limitation to a configuration in which the front side members 14, the lower cross-member 16, the upper members 24, the upper cross-member 26, and the front bumper reinforcement member 38 are each formed by extrusion forming a lightweight metal material with a uniform cross-section. Configuration may be made, for example, by forming a closed cross-section shape by joining an outer panel and an inner panel, not illustrated in the drawings, together.

Furthermore, the front side members 14, the lower cross-member 16, the upper members 24, the upper cross-member 26, and the front bumper reinforcement member 38 may each be formed with a rectangular closed cross-section shape with one or plural partitioning walls integrally formed inside the closed cross-section, in order to suppress cross-section deformation occurring due to the input of load. As illustrated in FIG. 2, for example, the front bumper reinforcement member 38 may be configured with two partitioning walls 39 formed vertically separated from each other inside the closed cross-section.

Explanation follows regarding operation of the vehicle body structure 10 according to the present exemplary embodiment with the above configuration.

Figure 4:
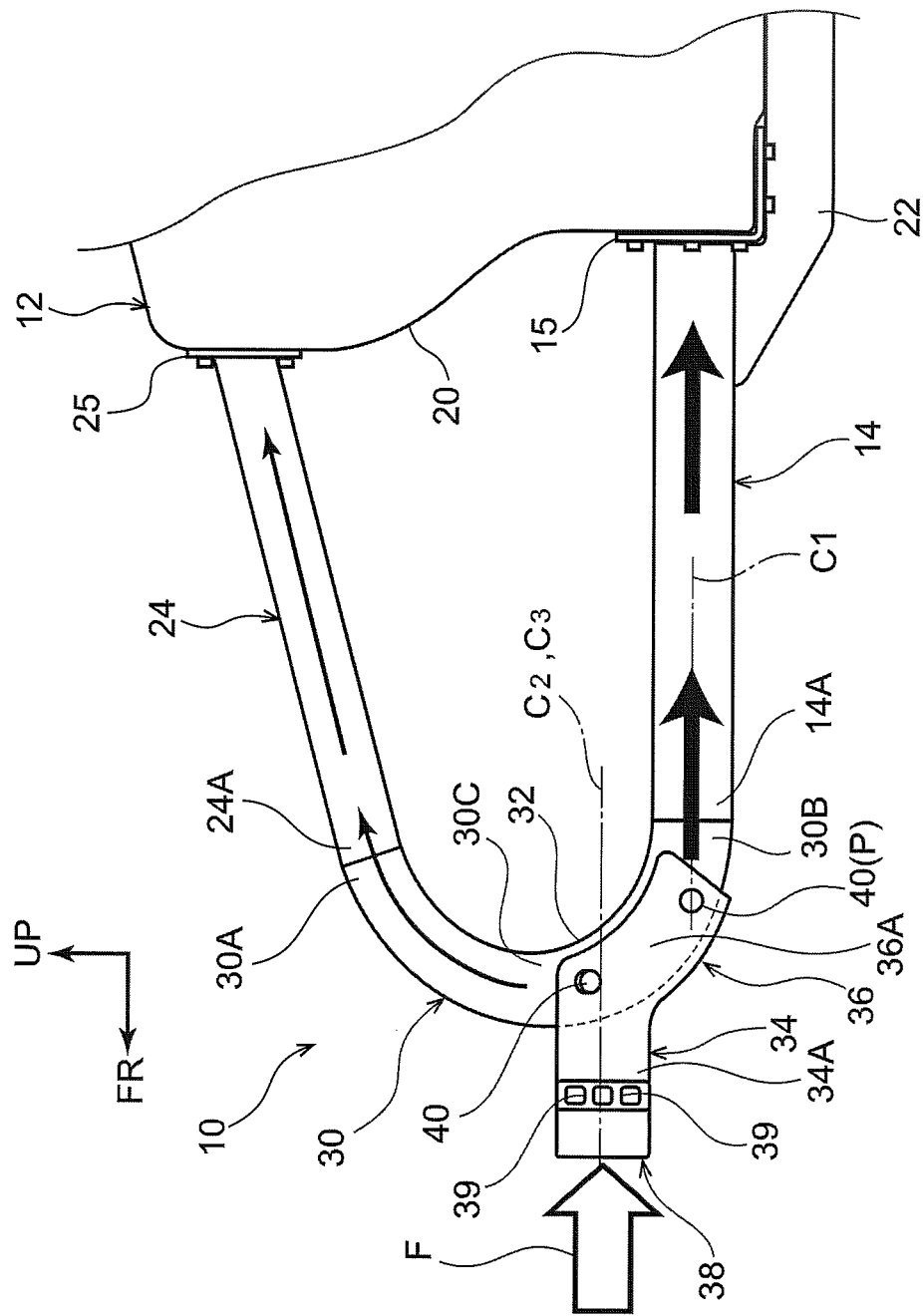
FIG. 4 is a side view illustrating a transmission path of a collision load during a frontal collision in the vehicle body structure according to the exemplary embodiment.

As illustrated in FIG. 4, a collision load F from the vehicle front side is input to the front bumper reinforcement member 38 in a frontal collision (a full overlap collision or an offset collision) of the vehicle 12. When this occurs, since the center line C2 passing through the centroid of the front bumper reinforcement member 38 is at substantially the same position in the vehicle up-down direction as the center line C3 passing through the centroid of the respective crash boxes 34, the crash boxes 34 are efficiently crushed in an axial direction (vehicle front-rear direction), absorbing part of the collision load F.

The collision load that has not fully absorbed by the crash boxes 34 is then efficiently transmitted to the curved portions 32 of the coupling members 30 through the fitting portions 36. The coupling members 30, having the curved portions 32 curving toward the vehicle front side, couple together the front end portions 24A of the respective upper members 24 and the front end portions 14A of the respective front side members 14 that are separated from each other in the vehicle up-down direction (that have different positions from each other in the vehicle up-down direction) in the side view.

A cancelling moment acts in the curved portions 32 having curvature, against the collision load input from the vehicle front side (from the crash boxes 34). Thus, even when the collision load is input to the curved portions 32 from the vehicle front side, the curved portions 32 are less liable to deform (have high rigidity), and buckling (bending deformation) of the coupling members 30 is suppressed or prevented. Thus, the collision load input to the curved portions 32 of the coupling members 30 is efficiently transmitted to the front side members 14, and also efficiently transmitted (dispersed) to the upper members 24 (and the front pillars).

This enables concentration of load at the front side members 14 to be reduced, and enables each front side members 14 to be sufficiently configured of a lightweight metal material such as aluminum, with a lower strength than a steel plate. Moreover, the front side members 14 do not need to have increased plate thickness or to be reinforced by reinforcement (which would increase the number of components), i.e., the structure can be simple, thereby enabling a reduction in the weight of the vehicle 12. Furthermore, the manufacturing processes of the front side members 14 can be reduced, thereby enabling spending on equipment to be reduced, and enabling productivity of the front side members 14 to be improved.

The crash boxes 34 are joined to the curved portions 32 of the coupling members 30 at a position further toward the vehicle lower side than the vehicle up-down direction center portions of the curved portions 32. Specifically, the fitting portions 36 (flange portions 36A) of the crash boxes 34 extend toward the respective front side members 14, and the lower portion fastening points P of the fitting portions 36 (flange portions 36A) to the coupling members 30 are provided at substantially the same position in the vehicle up-down direction as the center line C1 passing through the centroid of the respective front side members 14.

This achieves reinforcement of the section from the coupling members 30 to the front side members 14, and enables more collision load to be efficiently transmitted to the front side members 14, which have a larger cross-section surface area than the upper members 24. Namely, the vehicle body structure 10 according to the present exemplary embodiment enables collision load input to the vehicle 12 during a frontal collision to be more efficiently absorbed, while reducing concentration of the load at the front side members 14 and controlling the load not to be concentrated at the upper members 24.

Moreover, since the crash boxes 34 are joined to the curved portions 32 of the coupling members 30 at a position further toward the vehicle lower side than the vehicle up-down direction center portions of the curved portions 32, the legs of a pedestrian can be protected in the event of a frontal collision of the vehicle 12 with the pedestrian. Namely, the vehicle body structure 10 according to the present exemplary embodiment also achieves an improved pedestrian protection performance.

Furthermore, the lower brackets 18 for attachment to the lower suspension arms are provided at the coupling portions of the lower cross-member 16 to each front side member 14, and the upper brackets 28 for attachment to the upper suspension arms are provided at the coupling portions of the upper cross-member 26 to each upper member 24 (see FIG. 1).

The front end portions 14A of the front side members 14 and the front end portions 24A of the respective upper members 24 are coupled together vertically by the respective (high rigidity) coupling members 30 that have curvature. Thus, in the vehicle structure 10 according to the present exemplary embodiment, there is high supporting rigidity with respect to load input from the lower suspension arms and the upper suspension arms, enabling handling stability performance to be improved.

Although the vehicle body structure 10 according to the present exemplary embodiment has been explained based on the drawings, the vehicle body structure 10 according to the present exemplary embodiment is not limited thereto, and design modifications may be implemented as appropriate within a range not departing from the spirit of the present disclosure. For example, although the coupling members 30 are preferably configured including the curved portions 32 curving toward the vehicle front side, a configuration without the curved portions 32 may be applied as long as the configuration has similar rigidity to that including the curved portions 32.

Moreover, the front side members 14, the upper members 24, and the coupling members 30 may be integrally formed by extrusion forming a lightweight metal material. Furthermore, a configuration may be applied in which the center line C2 passing through the centroid of the front bumper reinforcement member 38, and the center line C3 passing through the centroid of the respective crash boxes 34 are not at substantially the same position in the vehicle up-down direction, as long as collision load is efficiently transmitted from the front bumper reinforcement member 38 to the crash boxes 34.

Configuration may also be applied, for example, in which the fitting portions 36 (flange portions 36A) of the crash boxes 34 are joined to the vehicle up-down direction center portions (locations at apex points) of the coupling members 30, without extending toward the respective front side members 14. Namely, configuration may be applied in which the lower portion fastening points P of the fitting portions 36 (flange portions 36A) of the crash boxes 34 to the curved portions 32 of the respective coupling members 30 are not at substantially the same position in the vehicle up-down direction as the center line C1 passing through the centroid of the respective front side members 14.

Alternatively, the fitting portions 36 (flange portions 36A) of the crash boxes 34 may further extend toward the respective front side members 14. In such a case, the overlap amount of the fitting portions 36 (flange portions 36A) with the respective front side members 14 increases, thereby enabling the front side members 14 to be reinforced, and enabling the attachment strength of the crash boxes 34 to be improved.

What is claimed is:

1. A vehicle body structure comprising:
a side member that is disposed running along a vehicle front-rear direction;
an upper member that, when viewed along the vehicle width direction, is disposed running along the vehicle front-rear direction at a vehicle upper side of the side member, and comprises a vehicle front-rear direction outside end portion that is positioned at a different position in a vehicle up-down direction from a position in the vehicle up-down direction of a vehicle front-rear direction outside end portion of the side member;
a coupling member that couples the vehicle front-rear direction outside end portion of the upper member and the vehicle front-rear direction outside end portion of the side member, the coupling member comprising a curved portion curving toward a vehicle front-rear direction outer side; and
a crash box that comprises a vehicle front-rear direction inside end portion that is joined to the coupling member.

2. The vehicle body structure of claim 1, further comprising a bumper reinforcement that is joined to a vehicle front-rear direction outside end portion of the crash box,
wherein a center line passing through centroids of the bumper reinforcement and a center line passing through centroids of the crash box are at substantially a same position in the vehicle up-down direction.

3. The vehicle body structure of claim 2, wherein the vehicle front-rear direction inside end portion of the crash box is joined to the coupling member at a position further toward a vehicle lower side than a vehicle up-down direction center portion of the coupling member.

4. The vehicle body structure of claim 1, further comprising a bumper reinforcement that is joined to a vehicle front-rear direction outside end portion of the crash box,
wherein the vehicle front-rear direction inside end portion of the crash box is joined to the coupling member at a position further toward a vehicle lower side than a vehicle up-down direction center portion of the coupling member.

5. The vehicle body structure of claim 1, wherein:
the vehicle front-rear direction inside end portion of the crash box extends toward the side member; and
a fastening point of the vehicle front-rear direction inside end portion of the crash box to the coupling member and a center line passing through centroids of the side member are provided at substantially a same position in the vehicle up-down direction.

6. The vehicle body structure of claim 4, wherein the crash box is disposed at a vehicle upper side position relative to the side member.

* * * * *